United States Patent Office 3,313,733
Patented Apr. 11, 1967

3,313,733
LUBRICATING OIL COMPOSITIONS CONTAINING MICROGEL POLYMERS OF DIVINYLBENZENE AND POLYETHYLENE GLYCOL METHACRYLATES
Louis de Vries, Richmond, Calif., assignor to Chevron Research Company, a corporation of Delaware
No Drawing. Original application July 30, 1962, Ser. No. 213,095. Divided and this application Apr. 29, 1965, Ser. No. 451,987
3 Claims. (Cl. 252—57)

This application is a division of Louis de Vries U.S. patent application Ser. No. 213,095 filed July 30, 1962.

This invention pertains to lubricating oil compositions. More particularly, it covers microgel polymers consisting of microgels having molecular weights in the range of about 5,000,000 to about 50,000,000 which are prepared by emulsion polymerization.

Most of the previously known crosslinked polymers are hard materials or tend to become hard and glass-like. They are thermosetting and not adaptable for lubricating purposes. Other known crosslinked polymers turn into latex-like masses, which upon slight working coalesce into rubber shapes.

The prior art methods for producing the rubbery latexes or the solid thermoplastics are unsuitable and do not yield a microgel adaptable for lubricating oil purposes.

It has now been found that microgels of proper nature have thickening power for oils comparable to conventional V.I. improvers of much lower molecular weight, but surprisingly have shear stabilities much greater than would be expected or predicted from the very large size of the molecule. In addition, the polymers of the invention have improved detergency compared to conventional polymeric detergents. It is not clear upon what theory the improved detergency of the oil-soluble microgels is based. It seems that the beneficial action is possibly due to an increased thickness of the adsorbed layer on the deleterious materials to be suspended.

It has now been found that in the preparation of a polymer useful for improving the viscosity and detergent properties of a lubricating oil, these characteristics may be achieved by admixing from 5% to 15% of a bifunctional crosslinking agent such as divinylbenzene, divinylcyclohexane and ethylene glycol dimethacrylate with monomers which comprise the units of the polymer, emulsifying said mixture in water and polymerizing by means of a water-soluble, peroxide-type catalyst and separating the polymer from the aqueous phase.

Thus, the invention involves a process for preparing a polymer useful for improving the viscosity and detergency characteristics of a lubricating oil comprising the steps of reacting from 5% to 15% of a bifunctional crosslinking agent selected from the group consisting of at least one member of divinylbenzene, divinylcyclohexane, N,N'-ethylene-bis-acrylamide and ethylene glycol dimethacrylate, with ethylenically unsaturated monomers which comprise the units of the polymer, emulsifying said mixture in water, and polymerizing by means of a water-soluble peroxide type catalyst and separating the polymer from the aqueous phase.

Still further, the invention involves a lubricant composition comprising a major proportion of mineral lubricating oil and a minor proportion sufficient to improve the viscosity-temperature characteristics of a microgel polymer of monomers consisting in the combined form of:

(a) oil-solubilizing monomers,
(b) diolefinically unsaturated, crosslinking monomers having two polymerizable olefin groups, and
(c) monomeric polar compounds having a polymerizable ethylenic linkage and a polar group, said polymer having a molecular weight in the range of from about 5,000,000 to about 50,000,000 and being soluble in mineral lubricating oil in amounts of at least about 0.1% by weight.

Additionally, the invention involves an oil-soluble microgel addition type of polymer useful for improving the viscosity and detersiveness of a lubricating oil comprising, in the combined form, copolymerizable ethylenically unsaturated compounds selected from the class consisting of:

(a) olefinic hydrocarbons,
(b) olefinic ethers containing a single oxygen atom,
(c) amides derived from hydrocarbon carboxylic acids containing at most two carboxy groups and containing a carbon-to-carbon double bond in the acid moiety,
(d) esters derived from hydrocarbon carboxylic acids containing at most two carboxy groups fully esterified,
  (1) wherein the amides and esters contain moieties selected from the group consisting of:
    (i) hydrocarbons containing at least 8 to 30 carbon atoms,
    (ii) alkylcycloalkyl and cycloalkylalkyl, wherein the alkyl is of from 8 to 30 carbon atoms, and the cycloalkyl is of from 4 to 8 carbon atoms,
    (iii) polyglycol groups having molecular weights of from about 200 to 10,000 and from 2 to 7 carbon atoms in each alkylene group having as a terminal group a hydroxy moiety,
    (iv) polyglycol groups having molecular weights of from about 200 to 10,000 and from 2 to 7 carbon atoms in each alkylene group having as a terminal group an ether moiety having from 8 to 30 carbon atoms,
    (v) alkaryl groups of from 6 to 30 carbon atoms,
    (vi) arylalkyl groups of from 7 to 30 carbon atoms,
    (vii) straight- and branched-chain alkyl oxyalkyl groups wherein the alkyl may be from 1 to 20,
    (viii) heterocyclics and amines of the structure

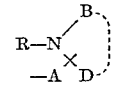

of which A is a hydrocarbon radical of 2 to 18 carbon atoms, B and R are groups selected from the class consisting of hydrogen and hydrocarbon radicals of up to 18 carbon atoms, aliphatic nitrogen-containing groups having 2 to 4 carbon atoms per nitrogen atom, and compounds wherein B and D joined form a nitrogen-containing heterocycle of from 4 to 8 carbon atoms, provided when A is attached to the nitrogen of

R is zero.
(e) 1 to 3 basic nitrogen-containing heterocyclic compounds carrying a polymerizable ethylenically unsaturated hydrocarbon moiety,
(f) unsaturated ethers of basic amino alcohols wherein the nitrogen substituents have from 0 to 2 hydrocarbyl moieties exclusive of the ether moiety,
(g) fatty acid esters of olefinic moieties wherein the olefin is of from 2 to 6 carbon atoms and the fatty acid is of from 8 to 24 carbon atoms, and
(h) as an essential constituent a difunctional microgelling agent selected from the class consisting of divinylbenzene, ethylene glycol divinylether, divinylcyclohexane, N,N'-ethylene-bis-acrylamide, and ethylene glycol dimethacrylate, wherein the microgelling agent is in an amount of from 5 to 15% and wherein the oil-soluble groups of the polymer are of at least two groups per group of the difunctional agent, and wherein the molecular weight of the microgelled polymer is of from about 5,000,000 to about 50,000,000, the oil-solubility being at least 0.1%. The proportion of a polar component in the microgel polymer is dictated by the oil solubility of the starting monomers used.

The novel detergency and viscosity-improving microgels are made from polymeric detergents that may be modified to produce the microgel polymer. Generally, a previously mentioned bifunctional monomer is admixed with the monomers normally used and emulsion polymerization techniques are employed. Examples of such detergent-type monomers which are incorporated by reference into this application are found in U.S. Patents 2,892,779, 2,892,783, 2,892,818, 2,892,819, 2,892,820 and 2,993,032. Other polymeric detergents can be modified to produce the microgel polymer. The choice of monomeric mixtures employed must yield an oil-soluble polymer. The choice and proportions of monomers necessary to effect these are well taught in the above patents. Examples of those monomers which may be used as typical are: acrylate and methacrylate esters of alcohols containing 8 or more carbon atoms, vinyl and allyl esters of fatty acids, olefinically unsaturated acids, polyglycol esters of olefinically unsaturated acids, unsaturated amides, vinylpyrrolidone and vinylpyridine. These monomeric compounds may be used either singly or in an admixture, as long as the choice gives oil-soluble polymers.

The reaction is carried out in water by emulsion polymerization techniques. The monomers making up the bulk of the polymer are added to water with an emulsifying agent and the difunctional monomer. It may be added at the start or preferably a portion is added initially and the remainder in increments during the course of the polymerization. The bifunctional monomer makes up about 5% to 15% of the polymer. Finally, a water-soluble peroxide-type catalyst is added and the polymerization is carried out at ambient temperatures. When the polymerization is complete, the polymer is coagulated and separated from the water phase.

Any type of efficient emulsifier may be used. Examples of typical emulsifiers are soluble salts of long-chain alkyl carboxylic or sulfuric acids, soluble salts of long-chain alkane sulfonic acids, acid salts of long-chain alkyl amines and long-chain alkyl quaternary ammonium salts.

The more commonly known surface-active compounds are: soluble salts of long-chain alkane carboxylic acids, such as potassium or sodium salts of oleates; cocoanut fatty acids or tallow fatty acids; and soluble sodium, potassium, etc., salts of sulfuric acid alkyl esters. Other emulsifiers are sulfonic acids and their salts such as polyolefin alkylated benzene condensation product sulfonates. Still other emulsifiers are acid salts of long-chain alkyl amines such as hydrochloric acid salt of octadecenylamine. Generally, the salts of amines of from 8 to 18 carbon atoms are within the scope of the amine term. The corresponding quaternary ammonium salts are also suitable emulsifiers. These are generally made from the amines. Representative examples of the quaternary ammonium compounds are cetyltrimethyl ammonium salts of acids such as HCl, HBr, or $HSO_4CH_3$. Others are such as cocoanut fatty alkyl dimethylbenzyl ammonium chloride or bromide. The amount of emulsifier used may be varied. Any amount which effectively controls the drop size of the monomers is suitable.

The catalysts are of the water-soluble peroxide-type suitable in the emulsion polymerization field. Typical catalysts are such as hydrogen peroxide, urea peroxide, perborates, persulfates and percarbonates.

Catalyst activators may be used in conjunction with the catalyst. They are oxidizable compounds and metals and include iron, copper and sulfur dioxide, sulfites, bisulfites, thiosulfates and hydroquinone.

In certain cases it may be desirable to add other agents to improve emulsification or reaction conditions; thus, regulators of surface tension such as alcohols may help emulsification. Buffers may be used to maintain a constant hydrogen ion concentration. The need for buffers would depend on the reaction conditions and the respective monomers and catalysts used. The use of buffers such as sodium bicarbonate and sodium salts of phosphoric acid derivatives is well known to others skilled in the art. Other buffers such as potassium persulfate and sodium sulfate may also be used. Typical preparations and tests are illustrated by the following examples.

*Example I.—Copolymers of alkyl methacrylates and divinylbenzene crosslinking agent*

The alkyl methacrylates used in this preparation consisted of 60% by weight dodecyl methacrylate and 40% by weight octadecyl methacrylate. The divinylbenzene was a 50% solution in ethylvinylbenzene. (This is referred to as a "divinylbenzene solution.")

In a 5-liter flask were placed 375 grams water, 7.5 grams sodium dodecylsulfate, 56 grams alkyl methacrylate, 2.5 grams divinylbenzene solution (50% divinylbenzene in ethyl vinylbenzene), and 0.5 gram sodium bisulfite. The mixture was maintained at room temperature. Every four hours 0.2 gram divinylbenzene solution was added; and the reaction was continued for 24 hours. This amount of divinylbenzene is about 7% of the mixed monomer.

The polymer was coagulated by adding aluminum sulfate followed by a large excess of methyl alcohol. The polymer was repeatedly triturated with water to remove aluminum sulfate. The product was then dissolved in benzene. The water was removed from the resulting emulsion by azeotroping. The dry benzene solution was then filtered. The filtrate had an opaque appearance due to dispersion of light by the polymer particles. The polymer could be separated from the benzene solution in a centrifuge at 15,000 r.p.m. This polymer redissolved in benzene to regenerate the opaque solution. The molecular weight, determined by standard ultracentrifuge methods, was 16,000,000. The benzene solution contained 3.27% polymer. A 2.8% solution in r.p.m. 150 Neutral Oil was prepared by the addition of a calculated amount of benzene solution to the oil and by removal of the benzene by means of vacuum. This oil had the following properties:

| | |
|---|---|
| Viscosity at 210° F. SUS | 59.58 |
| Viscosity at 100° F. SUS | 265.0 |
| Viscosity index | 144.0 |
| Shear loss, percent | 45.8 |

This shear loss compares favorably with conventional polymers having molecular weights well below 1,000,000. A straight-chain polymer of the same molecular weight as the microgels would lose all its original shear strength. Consequently, a small weight percent of a properly balanced microgel may thicken a desired oil to a suitable V.I. level. It would not be possible if the shear loss was considerable.

The shear stability or loss of the polymer was determined by measuring the percentage loss of viscosity after a given time according to standard shear strength determination. This method which duplicates normal shear breakdown forces found in oil solutions utilizes an ultrasonic vibrator. The power is set so that a sample of 150 Neutral Oil, which is thickened to a viscosity of 60 SUS at 210° F. with a commercial V.I. improver, Acryloid 763 will lose 30 to 35% of its original thickening power after 25 minutes. (Acryloid 763 is a mixture of polyalkyl methacrylates wherein the alkyl groups of $C_8$ to $C_{18}$ have an average molecular weight of 400,000.) The shear resistance of the polymer to be measured is then determined by placing the polymer sample blended in the same oil to 60 SUS at 210° F. According to this method identical samples are run in duplicate for 20 minutes with the viscosity determined before and after. The power drift of the ultrasonic vibrator from the above power setting is determined by using r.p.m. 150 Neutral Oil thickened with Acryloid 710 to 60 SUS at 210° F. and which oil normally loses 16 to 19% of its original thickening power. (Acryloid 710 is a mixture of polyalkyl methacrylates wherein the alkyl groups are $C_8$ to $C_{18}$, and the average molecular weight is 220,000.) This is done with two samples for 20 minutes with the viscosity determined before and after the actual experiment.

*Example II.—Copolymer of dodecyl methacrylate, polyethylene glycol methacrylate and divinylbenzene*

In this example the polyethylene glycol methacrylate was prepared from a polyethylene glycol having a molecular weight of 2000. The divinylbenzene was a 50% solution in ethyl vinylbenzene.

In a 2-liter flask was placed 3 grams sodium dodecyl methacrylate, 1.2 grams polyethylene glycol methacrylate, 150 grams water, 0.2 gram potassium persulfate and 0.2 gram sodium bisulfite. To this mixture 0.8 gram of the above mentioned divinylbenzene solution was added and the mixture stirred with the addition of 0.15 gram divinylbenzene solution every 8 hours for a total period of 48 hours. The divinylbenzene comprised about 9% of the total monomers.

The polymer emulsion was precipitated in methanol, washed with water, then with methanol and dissolved in benzene. The solution was filtered twice. The molecular weight of the polymer was 10,000,000 determined by the standard ultracentrifuge method.

A solution containing 2.8% of this polymer in r.p.m. 150 Neutral Oil had the following characteristics:

| | |
|---|---|
| Viscosity at 210° F. SUS | 63.7 |
| Viscosity at 100° F. SUS | 218.0 |
| Viscosity index | 139.5 |
| Shear loss, percent | 43.0 |

The shear loss was determined according to the standard method as described in Example I.

The microgel solution of Example II was compared in the Standard FL-2 engine test with a conventional polymer. The conventional polymer was a polymer comprised of monomeric units of lauryl methacrylates and decaethylene glycol methacrylate.

In this test a given lubricating oil composition is tested as a crankcase lubricant in a 6-cylinder Chevrolet engine using a low grade gasoline, especially prone to cause engine deposits, the conditions being those defined in the Standard FL-2 test procedure as described in the June 21, 1948, report of the Coordinating Research Council. Briefly, this procedure requires the maintenance of a jacket temperature of 95° F. and a crankcase oil temperature of 155° F. at 2500 r.p.m. and 45 brake horsepower of 40 hours, and, therefore, closely simulates the relatively cold engine conditions which are normally experienced in city driving. At the end of each test, the engine is dismantled, and the amount of engine deposit on the piston determined and expressed as the "piston deposit rating." This value is obtained by visually rating the amount of deposit on each piston skirt and averaging the individual ratings so obtained for the various pistons. (The scale is from 0 to 10, with 10 representing the absence of any deposits.) Under this test a piston deposit rating of 4.5 indicates satisfactory performance. Preferably, this rating should be 5 or above.

Each of the tested oils was made up from a lubricating oil derived from California waxy petroleum (SAE 30 grade) oil containing 1% of the tested polymer and 12 millimoles/kg. of zinc di-(mixed lower alkyl) dithiophosphates.

The oil containing the microgel polymer of Example II of this invention had a Piston Deposit Value of 8.4, while the oil containing the conventional V.I. polymer additive described above had a Piston Deposit Value of 6.5. On a scale from 0 to 10, a difference of 0.5 is considered significant. Thus, the experiment illustrates the superior detergency of the new polymeric microgel thickeners in actual use in lubricating oils.

Ordinarily a major proportion of lubricating oil is employed in combination with a minor amount of microgel sufficient to improve the thickening power of oils. Preferably, the amount of microgel in oil will vary from about 0.05% to about 10.0%. The effective amount, however, can easily be determined by those skilled in the art.

The microgels of this invention are used with good effect in any of a wide variety of oils of lubricating viscosity or blends of such oils. Thus, the base oil can be a mineral lubricating oil of either paraffinic or naphthenic types. Synthetic lubricating oils may also be used, including alkylene oxide polymers such as the 2-ethylhexanol-initiated polymer of propylene oxide and/or ethylene oxide. Esters of carboxylic acids, such as di-(2-ethylhexyl) sebacate, are also suitable. If desired, the base oil can be a mixture of mineral oils and/or synthetic oils.

The microgels of this invention are also useful in lubricant compositions in combination with other additives such as pour point depressants, anti-oxidants, oiliness and extreme pressure agents, detergents, as well as other conventional additives. Illustrative additives of these types include the polyalkyl methacrylate and dialkyl fumarate pour point depressant, tricresyl phosphate oiliness agent, octadecenyl amine salt of mixed mono- and didodecyl phosphate extreme pressure agent, calcium petroleum sulfonate detergents, polyglycol substituted polymeric dispersants and others.

According to the present invention, the microgel may be admixed with oil to form concentrates. The concentrate can be later diluted to form the finished product.

What is claimed is:

1. A lubricating oil composition comprising a major proportion of mineral lubricating oil and a minor proportion sufficient to improve the detergent and viscosity-temperature characteristics thereof of a polymer prepared by the process which comprises forming a mixture consisting of divinylbenzene, dodecyl methacrylate and polyethylene glycol methacrylates in which the polyethylene glycol has a molecular weight of from about 200 to 10,000, said mixture consisting of from 5 to 15% by weight of divinylbenzene, emulsifying said mixture in water by means of a water-soluble emulsifying agent, polymerizing said mixture in said emulsion by means of a water-soluble peroxide free radical initiator catalyst under conditions providing a polymer having a molecular weight in the range of from about 5,000,000 to about 50,000,000 as determined by ultracentrifuge and separating the resulting polymer from the water.

2. A lubricating oil composition in accordance with claim 1 in which the polymer is present in amounts from about 0.05% to about 10.0% by weight.

3. A lubricating oil composition in accordance with claim 2 in which the polyethylene glycol has a molecular weight of 2,000.

References Cited by the Examiner

UNITED STATES PATENTS 2,744,844    5/1956    Benneville _____ 252—51.5 X

DANIEL E. WYMAN, *Primary Examiner.*

W. H. CANNON, *Assistant Examiner.*